US009415762B2

(12) United States Patent
Treharne et al.

(10) Patent No.: US 9,415,762 B2
(45) Date of Patent: Aug. 16, 2016

(54) ENGINE OPERATION FOR PLUG-IN HYBRID ELECTRIC VEHICLE

(75) Inventors: William David Treharne, Ypsilanti, MI (US); Sangeetha Sangameswaran, Canton, MI (US); Ted Haladyna, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1005 days.

(21) Appl. No.: 13/440,722

(22) Filed: Apr. 5, 2012

(65) Prior Publication Data
US 2013/0268182 A1 Oct. 10, 2013

(51) Int. Cl.
*B60W 10/06* (2006.01)
*F02N 11/08* (2006.01)
*F01M 1/16* (2006.01)

(52) U.S. Cl.
CPC .............. *B60W 10/06* (2013.01); *B60W 20/18* (2016.01); *F02N 11/0829* (2013.01); *B60W 2510/244* (2013.01); *B60W 2560/02* (2013.01); *B60W 2560/04* (2013.01); *F01M 2001/165* (2013.01); *F02N 2200/023* (2013.01); *F02N 2200/061* (2013.01); *F02N 2300/2002* (2013.01); *Y02T 10/48* (2013.01); *Y02T 90/14* (2013.01)

(58) Field of Classification Search
CPC ............ B60W 10/06; B60W 20/1086; B60W 2510/244; B60W 2560/02; B60W 2560/04; F01M 2001/165; F02N 11/0829; F02N 2200/023; F02N 2200/061; F02N 2300/2002; Y02T 10/48; Y02T 90/14
USPC ......... 73/114.55, 53.07; 340/457.4; 701/29.4, 701/29.5, 34.4, 113; 123/196 S, 198 DA, 123/179.3, 179.4; 180/65.28, 65.29, 65.265
See application file for complete search history.

(56) References Cited

U.S. PATENT DOCUMENTS

| | | | |
|---|---|---|---|
| 4,742,476 A | 5/1988 | Schwartz et al. | |
| 5,897,597 A * | 4/1999 | O'Daniel | G01M 3/025 123/574 |
| 6,037,864 A * | 3/2000 | Sem et al. | 340/457.4 |
| 6,222,445 B1 * | 4/2001 | Beckhusen | 340/457 |
| 6,253,601 B1 | 7/2001 | Wang et al. | |
| 6,449,538 B1 | 9/2002 | Kubo et al. | |
| 6,646,419 B1 * | 11/2003 | Ying | G01R 31/3668 320/132 |
| 6,739,177 B2 * | 5/2004 | Sato | F02D 41/0037 73/114.71 |
| 7,036,477 B1 * | 5/2006 | Thompson | F02D 17/04 123/179.4 |
| 7,631,710 B2 * | 12/2009 | Utsumi | F02D 29/02 123/179.3 |
| 7,748,214 B2 * | 7/2010 | Ishii et al. | 60/295 |
| 8,161,953 B1 * | 4/2012 | Mordukhovich | 123/572 |
| 8,196,559 B2 * | 6/2012 | Mordukhovich et al. | 123/196 A |
| 8,768,599 B2 * | 7/2014 | Blanchard | F02D 19/0628 180/65.28 |
| 8,844,272 B2 * | 9/2014 | Bidner | F01N 3/30 180/65.265 |

(Continued)

FOREIGN PATENT DOCUMENTS

GB 2444265 A 6/2008

*Primary Examiner* — Erick Solis
*Assistant Examiner* — Carl Staubach
(74) *Attorney, Agent, or Firm* — Julia Voutyras; Alleman Hall McCoy Russell & Tuttle LLP

(57) ABSTRACT

A method, comprising propelling a vehicle with an engine and a motor starting the engine if energy stored in an energy storage device is greater than an upper threshold level when a contaminant amount in the engine oil is greater than a threshold amount. In this way, it is possible to harmonize fuel degradation along with oil degradation, while still providing efficient vehicle and engine operation.

20 Claims, 10 Drawing Sheets

(56) References Cited

U.S. PATENT DOCUMENTS

| | | | |
|---|---|---|---|
| 2004/0038774 A1* | 2/2004 | Kuroda | B60K 6/485 477/3 |
| 2007/0074562 A1* | 4/2007 | Liu et al. | 73/53.05 |
| 2008/0167788 A1* | 7/2008 | Tate | B60K 6/48 701/104 |
| 2008/0283019 A1* | 11/2008 | Arakawa et al. | 123/196 R |
| 2009/0321159 A1* | 12/2009 | Andri | 180/65.25 |
| 2010/0076664 A1* | 3/2010 | Monros | 701/102 |
| 2010/0300781 A1 | 12/2010 | Leone | |
| 2013/0151056 A1* | 6/2013 | Nakano | 701/22 |
| 2013/0173106 A1* | 7/2013 | Konishi | 701/22 |
| 2013/0211641 A1* | 8/2013 | Fujii | 701/22 |
| 2014/0058647 A1* | 2/2014 | Haladyna et al. | 701/104 |
| 2014/0238369 A1* | 8/2014 | Jankovic et al. | 123/690 |

\* cited by examiner

ENGINE OPERATION FOR PLUG-IN HYBRID ELECTRIC VEHICLE

BACKGROUND AND SUMMARY

A plug-in hybrid electric vehicle (PHEV) provides the capability to operate significant distances solely in electric mode, without running the engine to recharge the battery. For example, some vehicle operators may exclusively take short trips, and may consistently plug in the vehicle between trips, such that the engine is infrequently started for charging.

Leone (US 2010/0300781) addresses degrading effects arising from long periods of engine inactivity, including water condensation, corrosion, stale fuel, and leakage of fluids past seals, or into the fuel system. To address these issues, Leone periodically starts and operates the engine, for example, to deplete stored fuel.

The inventor herein has recognized a potential issue with the above approach. Namely, while increased engine starting may address some issues, such as stale fuel, the increased number of starts, especially cold starts, can cause still other issues. For example, oil contamination may occur when the engine is inactive for extended periods of time, and can be exacerbated by increasing a number of cold engine starts. Specifically, when the engines are stopped and started repeatedly, especially when the engine is cold, gasoline and water contaminants can accumulate in the oil, thus degrading the oil and increasing friction and engine wear.

One approach that addresses the aforementioned issues is a method, comprising: propelling a vehicle with an engine and a motor; starting the engine if energy stored in an energy storage device is greater than an upper threshold level when a contaminant amount in engine oil is greater than a threshold. Further, such operation may occur even when the fuel in the fuel tank has recently been refilled. In this way, it is possible to harmonize fuel degradation along with oil degradation, while still providing efficient vehicle and engine operation.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
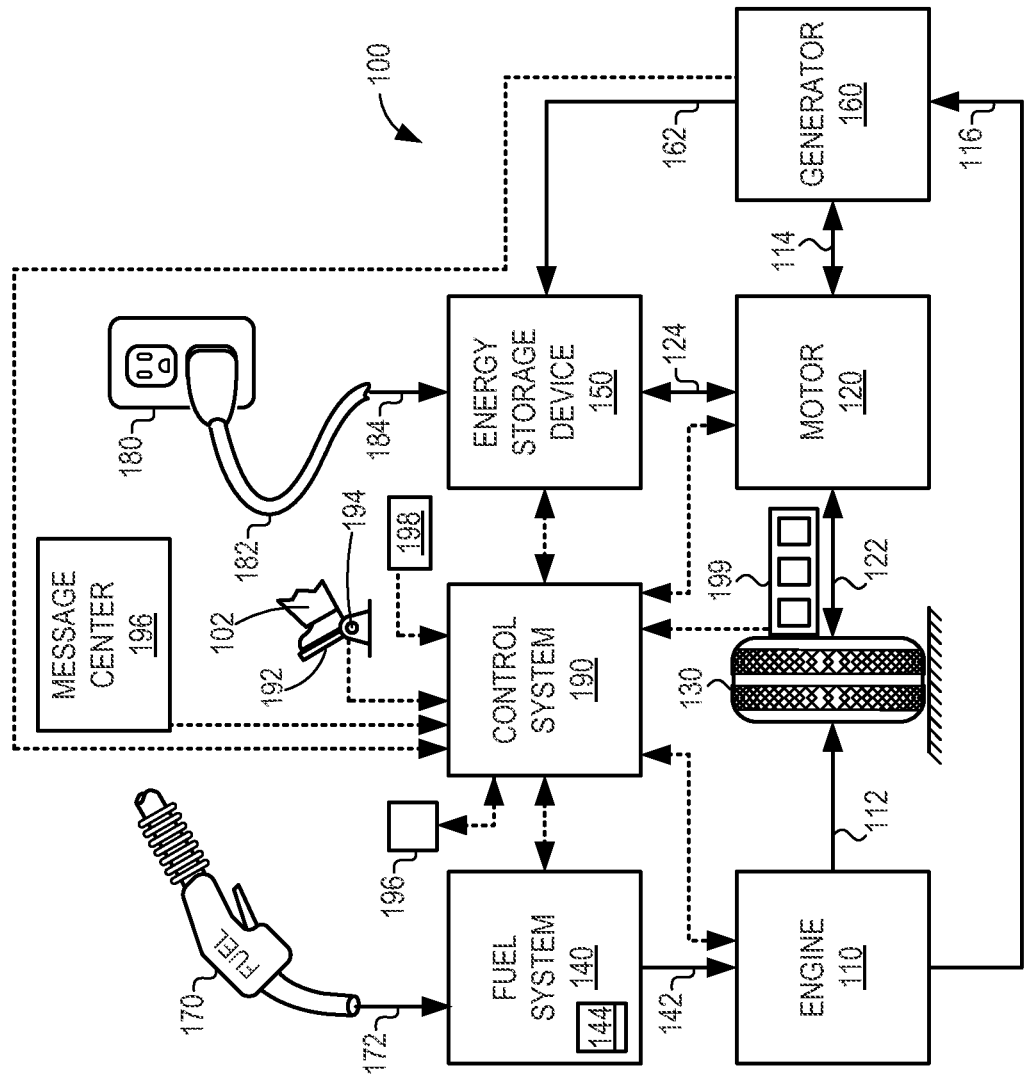
FIG. 1 illustrates an example vehicle propulsion system.
Figure 2:
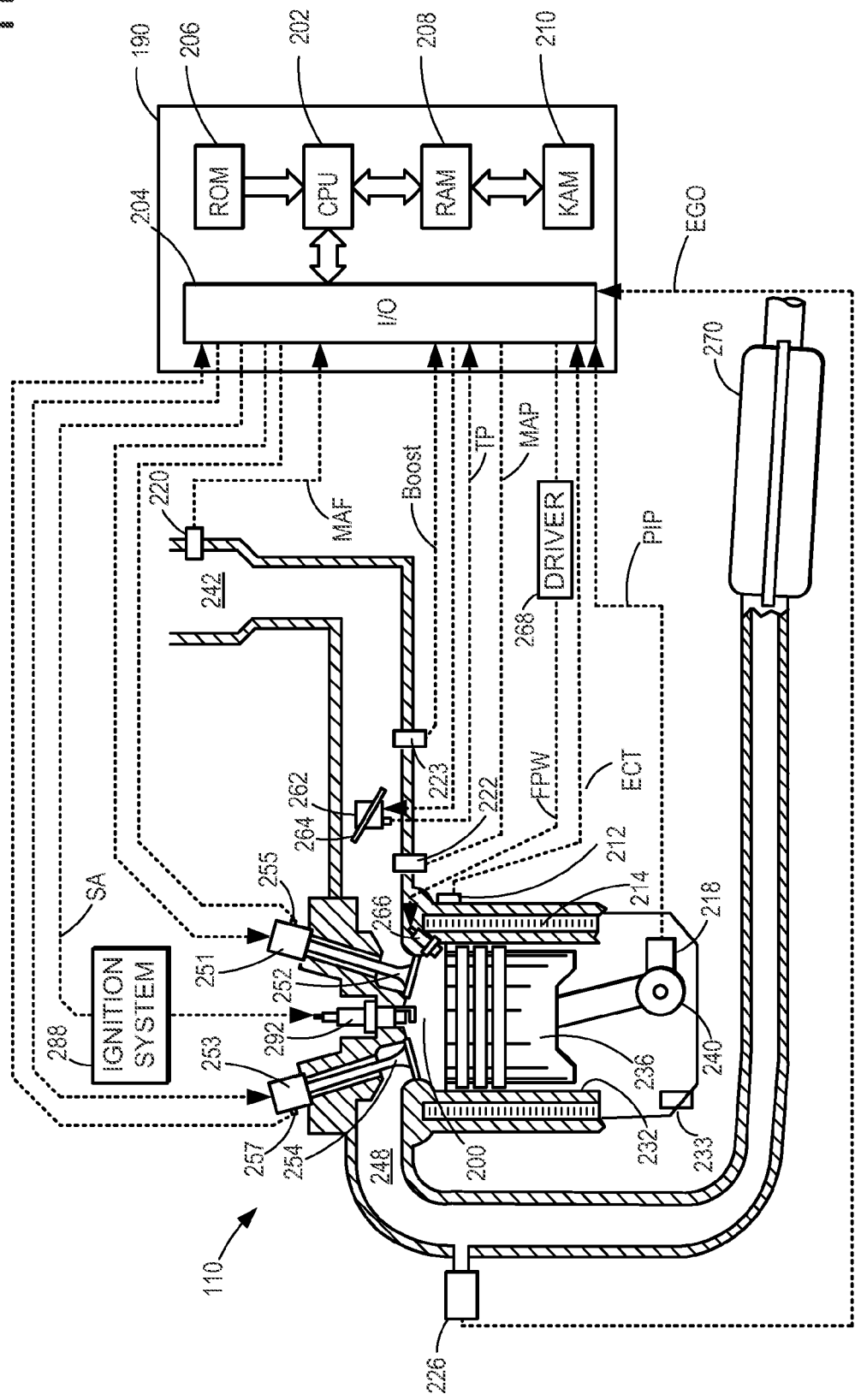
FIG. 2 illustrates an example internal combustion engine.

The following description relates to systems and methods for a plug-in hybrid vehicle, such as shown in FIG. 1, including an internal combustion engine, such as shown in FIG. 2.

A method is provided to propel the vehicle with an engine 110 and a motor 120, starting the engine when energy stored in an energy source supplying energy to the motor is greater than a first threshold level (threshold state-of-charge) when a contaminant amount in the oil of the engine is greater than a first threshold amount, where the engine may be started when the motor would otherwise propel the vehicle but for the contaminant in the amount in the oil. The engine start is carried out responsive to the contaminant amount being greater than the threshold even when a fuel in a fuel tank of the vehicle is aged less than a threshold age. The threshold age of the fuel may be based on the residence time of the fuel in the fuel tank after which the fuel contaminants will be above a threshold level (fuel degradation threshold) and an engine start may be forced in order to consume the aged fuel.

Further, oil contamination levels may be estimated based on an oil degradation count, computed by an oil degradation counter, stored in the control system memory to track the number of engine stops and engine starts, especially when the engine is cold (e.g., engine temperature, $T_{engine}$, is below a threshold temperature, $T_{threshold}$). Accordingly, the oil degradation count is adjusted, taking into account $T_{engine}$ and the temperature difference between $T_{engine}$ and $T_{threshold}$. For example, when $T_{engine}$ is very cold, or far below $T_{threshold}$, the oil degradation count may be incremented by a larger amount than when $T_{engine}$ is only slightly below $T_{threshold}$. Similarly if the engine has been operating at a temperature where $T_{engine}$ is below $T_{threshold}$ for a longer period of time, the oil degradation count may be incremented by a larger amount than if the engine has been operating at a temperature where $T_{engine}$ is below $T_{threshold}$ for a shorter period of time. The oil degradation count may also be adjusted to reflect a decrease in oil contamination levels when the engine is running, and the engine temperature is greater than the threshold temperature, taking into account the engine on time recorded by an engine on timer. For example, when $T_{engine}$ is very warm, or far above $T_{threshold}$, the oil degradation count may be decremented by a larger amount than when $T_{engine}$ is only slightly below $T_{threshold}$. Similarly if the engine has been operating at a temperature where $T_{engine}$ is above $T_{threshold}$ for a longer period of time the oil degradation count may be decremented by a larger amount than if the engine has been operating at a temperature where $T_{engine}$ is above $T_{threshold}$ for a shorter period of time. In some embodiments, the vehicle control system can select a particular clean out procedure from several available oil clean out procedures to be executed in response to various factors, including the oil degradation level, the battery state-of-charge, and other vehicle operating conditions; alternately, or additionally, the user can request a specific type of oil clean out procedure to be executed. In another example embodiment, a method of measuring the contaminants removed from the engine oil, for example, a moisture or hydrocarbon sensor in the positive crankcase ventilation (PCV) exhaust line may be employed to determine the efficacy of the clean out. Employing such a method would enable the vehicle controller to determine precisely when the oil contaminants are removed and the clean out procedure is to be terminated, so as to avoid unnecessarily prolonging the clean out procedure and wasting energy. In a further embodiment, the oil degradation count can be decremented or adjusted based on the level of contaminants detected in the PCV exhaust line. For example, if the level of contaminants detected in the PCV exhaust line is less than a minimum threshold amount, then the oil degradation count is not adjusted and the clean out may not be terminated. Using methods described in these example embodiments, the clean out of the engine oil can be carried out with respect to operation of the vehicle, including prolonging engine life and conserving energy by being responsive to various factors such as the oil degradation level, the battery state-of-charge and other vehicle operating conditions, or the wishes of the user.

In some examples, the engine oil clean out operation can be adjusted depending on various operating conditions. For example, a clean out procedure carried out during higher battery state-of-charge conditions may include engine operation that is different from engine operation during a cleanout at a lower battery state-of charge. For, example, during the higher state-of-charge conditions, the engine may be operated at higher temperatures or with increased waste heat (and optionally lower engine torque output) to more rapidly clean the oil, as compared to lower state-of-charge conditions. In this way, since the engine output may not be able to be stored, as little as possible is wasted while still removing the contaminants. During a clean out, while the vehicle is operated in engine mode and $T_{engine}$ is greater than $T_{threshold}$, the oil degradation count may be decremented. If the oil degradation count is reduced below a minimum oil degradation threshold, signaling that a very low oil contaminant level has been reached, the clean out may be terminated. As such, the clean out duration, where the vehicle is required to operate in engine mode at higher temperatures to clean out the oil contaminants can be deliberately ascertained, and will not be extended unnecessarily.

FIG. 1 illustrates an example vehicle propulsion system 100. Vehicle propulsion system 100 includes a fuel burning engine 110 and a motor 120. As a non-limiting ample, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

As will be described with reference to the process flow of FIG. 3, the vehicle propulsion system may be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

This plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

In some embodiments, control system 190 may receive an indication of the % oil degradation via an oil degradation count computed by an oil degradation counter. The % oil degradation (e.g. as identified by the oil degradation count) may be communicated to the vehicle operator, for example, via an oil contamination index meter indicated at message center 196. The message center may also include an input prompt, for example a push button or a virtual push button on a touch screen, for the vehicle operator to request or confirm the start of an oil clean out, or to select the type of clean out procedure as described herein.

Figure 10:
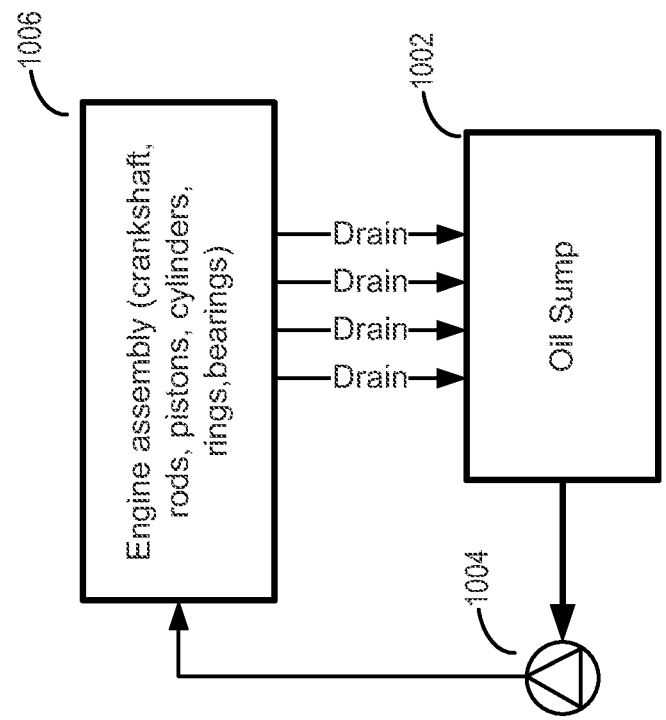
FIG. 10 illustrates an example oil system.

Lubrication of the engine 110 reduces wear of engine components and dissipation of heat arising from friction. FIG. 10 is a simplified schematic showing the flow of oil in a vehicle's lubrication system. Oil is pumped from the oil sump (1002) by an oil pump (1004) to lubricate many of the moving parts of the engine assembly (1006) such as the crankshaft 240 and its connecting rods, and bearings in the connecting rods and pins of the pistons 236. Oil is also used for lubrication between the rings of the engine piston 236 and the engine cylinders 200, forming a sliding oil film seal, and preventing leakage of the fuel/air mixture and exhaust from the combustion chamber into the oil sump during compression and combustion. The thickness and effectiveness of this oil film seal is dependent on the oil temperature and properties such as oil viscosity. After reaching the moving parts of the engine, the oil drains back to the sump.

As described herein, engine 110 may be periodically set to a deactivated state where the engine operation is discontinued, and the vehicle is propelled by the motor 120. Where engine 110 is deactivated for extended periods of time, the temperatures of the engine and its components such as the engine cylinders 200, valves (252, 254), and pistons 236, the engine oil, and engine seals, decrease to a cold state, below a threshold temperature ($T_{threshold}$). In a cold state, engine seals stiffen and lose resiliency, and are more prone to allow fluids such as fuel and water vapor to leak past them. When the oil is in a cold state, the oil viscosity and the sliding oil film seal thickness can change, and result in fuel leakage from the combustion chamber into the oil. Starting or stopping the engine in a cold state is thus a source of fuel contamination in the oil because the fuel delivered to the cold engine is not well-contained by the engine seals and oil seals. Fuel contaminants can oxidize the oil and reduce the oil base number causing premature corrosion and wear of engine parts. Fuel dilution of the oil can also alter the viscosity of the oil, and collapse the sealing oil films that lubricate the piston, rings and liners in the combustion zone, causing premature wear of those parts. Refilling the gasoline tank when the engine is shut down does not impact the oil degradation rate because the fuel contaminates and degrades the oil regardless of the fuel's age or the level of fuel contaminants.

Condensing water vapor also contaminates the oil when the engine temperature drops, or when hot fluids flow to the cold engine. The presence of water can degrade the oil, significantly increasing its corrosivity, and also increasing oil oxidation, resulting in premature corrosion and wear of engine parts. Water contamination of the oil is exacerbated by cold engine starts and stops because the fuel is also contaminated by condensing water vapor, and can entrain additional water as it is delivered to the engine combustion chambers.

Additionally, when the engine 110 is active and running to propel the vehicle, engine oil contaminant levels may decrease, as heat generated in the engine volatilizes the contaminants from the oil, for example.

The above examples are merely non-limiting examples of how oil contamination levels can change and how oil contamination following repeated cold engine stops and starts can lead to oil degradation. It will be appreciated that oil contamination and degradation may occur by other processes not explicitly recited above. Regardless of the particular manner by which oil contamination and degradation occurs, the process flows of FIGS. 3-8 at least partially address the issue of oil degradation in the context of a vehicle propulsion system that is configured as a plug-in hybrid electric vehicle.

FIG. 2 illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of PCV exhaust gas moisture and hydrocarbon content via PCV exhaust line gas sensor 233, an indication of intake valve position via sensor 255, and an indication of exhaust valve position via sensor 257, among others. For example, sensor 233 may be a humidity sensor, oxygen sensor, hydrocarbon sensor, and/or combinations thereof.

Furthermore, the control system may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

Figure 3:
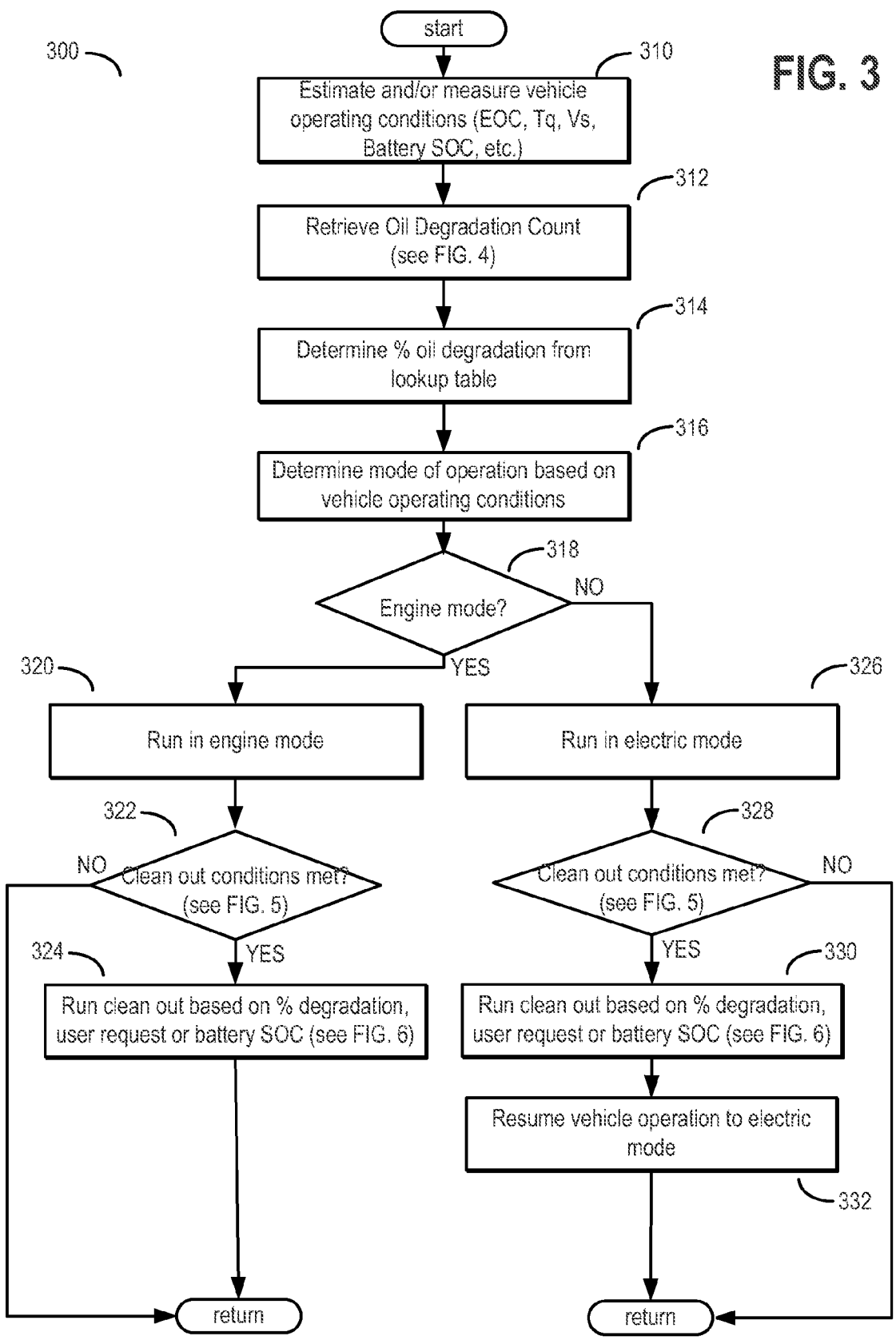
FIGS. 3-8 illustrate example routines.

FIG. 3 illustrates an example procedure 300 that may be used to control the operation of a plug-in hybrid electric vehicle (PHEV), including measuring a level of oil degradation and selectively carrying out an oil clean out procedure. Specifically, the control system 190 of FIGS. 1 and 2 may carry out the routine when the vehicle is in operation, including immediately following an event where the vehicle is first turned started when initiating engine rotation from rest.

Referring to FIG. 3 at 310, the control system assesses the operating conditions of the vehicle propulsion system. For example, control system 190 may receive sensory feedback from one or more sensors associated with the vehicle propulsion system components as described above. As a non-limiting example, these operating conditions may include one or more of the following: an indication of vehicle operator requested output from the vehicle propulsion system, an indication of engine temperature, an indication of state of charge (state-of-charge) of energy storage device 150, ambient conditions including humidity, temperature, etc. and others.

At 312, the procedure retrieves the oil degradation count from the oil degradation counter. Further details of various examples of how the oil degradation count is tracked and calculated are described with regard to FIG. 4, for example. Upon retrieving the oil degradation count, at 314, the procedure then uses a lookup table that relates % oil degradation to the oil degradation count. The relationship between % oil degradation and oil degradation count can be based on parameters such as oil type, oil temperature, ambient temperature ambient humidity, and the like.

Figure 5:
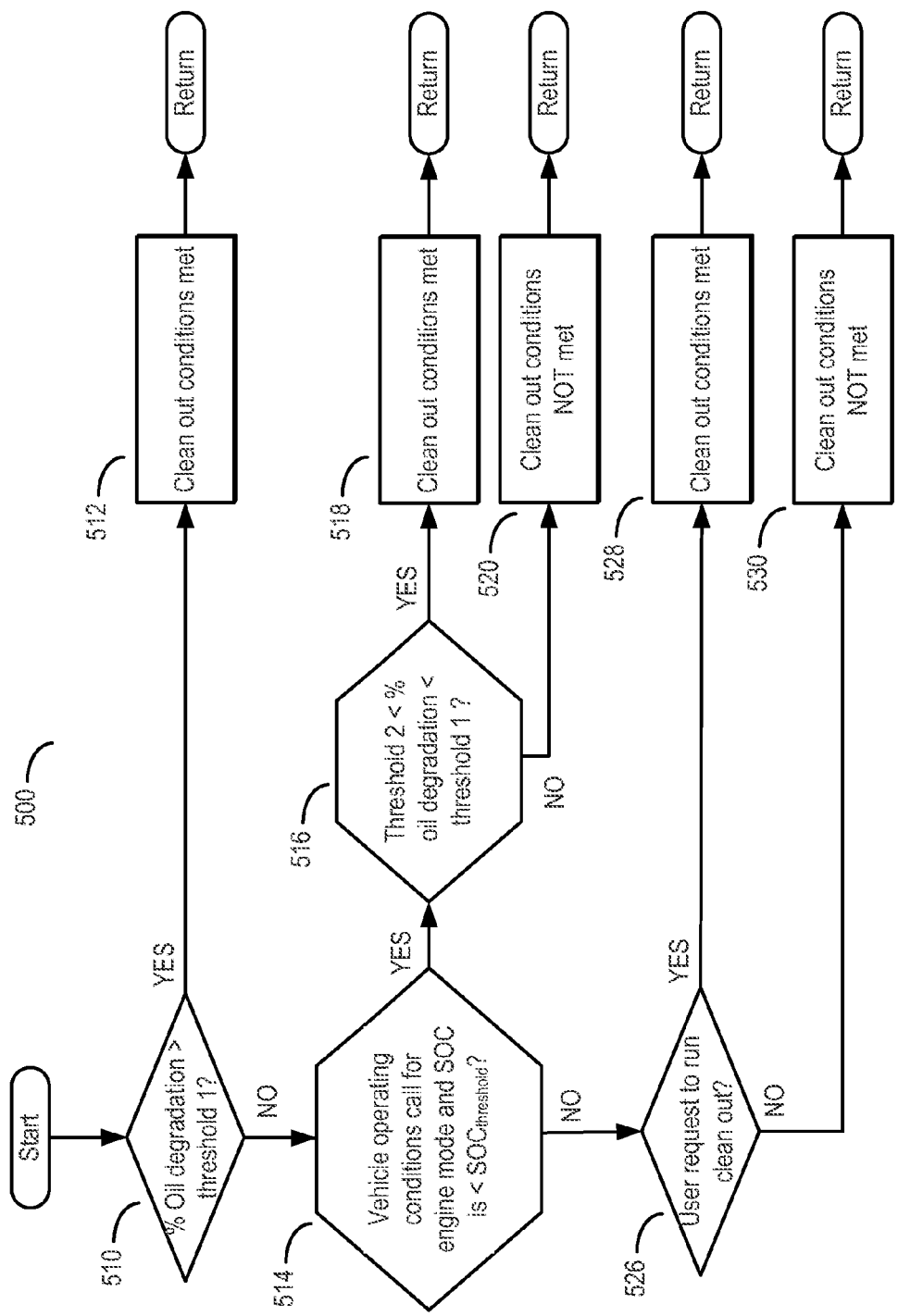

Based on the vehicle operating conditions assessed at 310, the procedure 300 then determines at 316 the mode of operation of the vehicle, further assessing at 318, if the vehicle is to be run in engine mode. If so, the procedure continues to 320, engaging engine mode. At 322, the procedure determines if the oil is to be cleaned out by evaluating if the clean out conditions are met. FIG. 5 provides additional details of the various selected conditions that may be identified. If the clean out conditions are met, then procedure 300 proceeds to run a clean out procedure at 324, based on the various clean out conditions, examples of which are shown in FIG. 5. Various examples of clean out procedures are described in FIG. 8. If the clean out conditions in 322 have not been met, or after a clean out procedure in 324 is finished, the procedure returns to 310.

If it is determined at 318 that the vehicle is not to be in engine mode, then electric mode is engaged at 326. At 328, the procedure determines if the oil is to be cleaned out by evaluating if the clean out conditions are met. FIG. 5 provides additional details of the various selected conditions that may be identified. If the clean out conditions are met, then procedure 300 proceeds to run a clean out procedure at 330, based on the various clean out conditions, examples of which are shown in FIG. 5. Various examples of clean out procedures are described in FIG. 8. Following completion of the clean out procedure, which may switch the operation of the vehicle to engine mode, the vehicle is returned to electric mode at 332. If the clean out conditions in 328 have not been met, or after the vehicle operation has resumed to electric mode in 332, the procedure returns to 310.

FIG. 3 thus shows a possible example of a method for integrating measurement of oil contamination, and management of procedures to clean out contaminants from the oil to prevent oil degradation, with other operational functions of the vehicle, particularly when the vehicle is running in either engine or electric mode.

Figure 4:
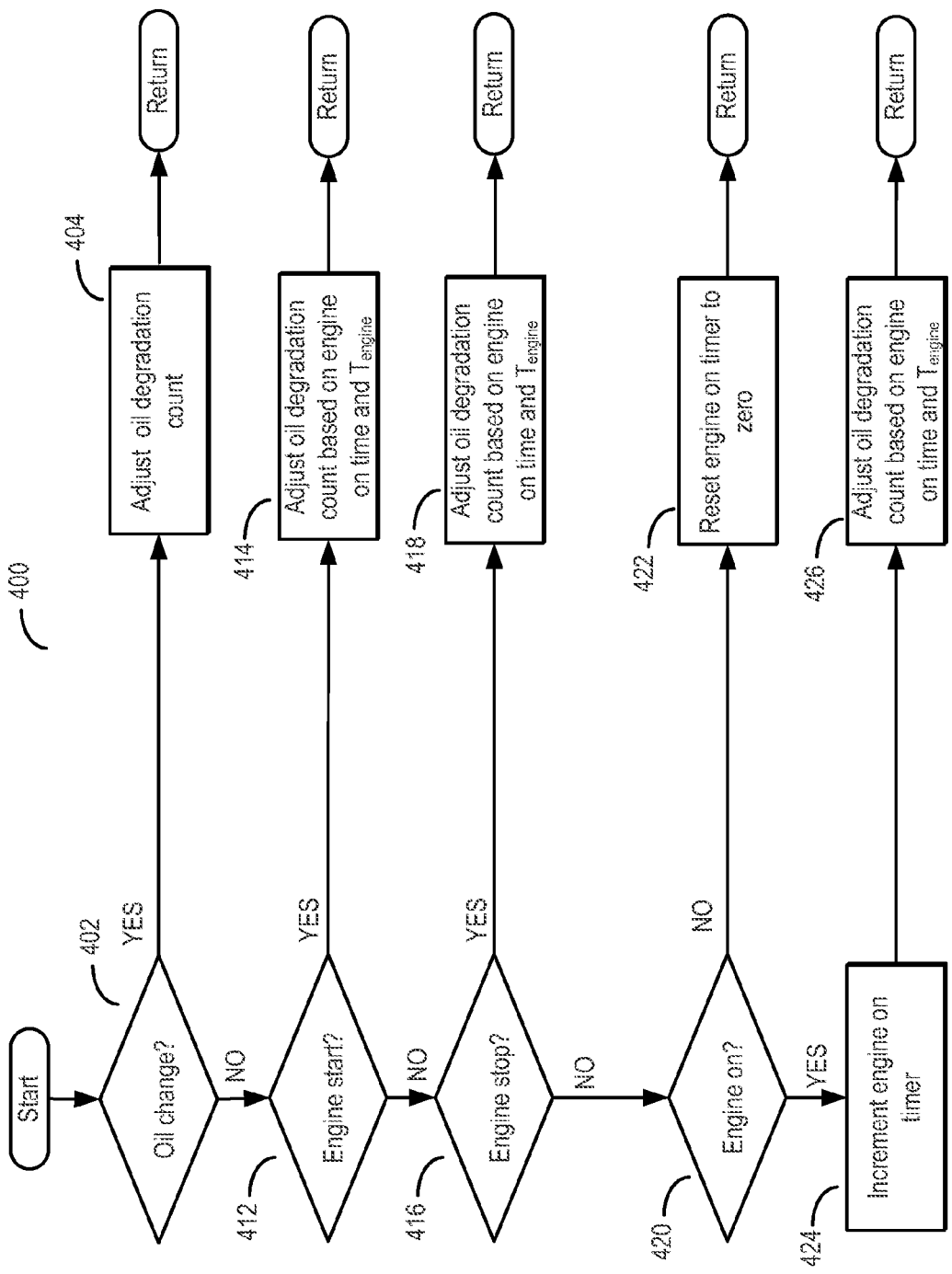

FIG. 4 illustrates an example procedure 400 to retrieve the oil degradation count, which is an indication of the oil contamination level. Procedure 400 determines if the vehicle is serviced for an oil change (402). If so, the oil degradation count is adjusted by the oil degradation counter (404) to a predetermined value at or below the minimum oil degradation threshold and the procedure returns to FIG. 3 at 312. If the oil is not changed, then the procedure continues to 412, where it is determined if the engine is started. If so, then procedure 400 continues at 414, at which the oil degradation count is adjusted by the oil degradation counter based on the engine on time and the engine temperature, $T_{engine}$, and the engine temperature relative to a threshold temperature, $T_{threshold}$. Here, $T_{threshold}$ can be an example of a temperature below which fluids, such as fuel and water vapor, can leak past seals in the engine and contaminate the oil. Above $T_{threshold}$, the engine may be warm enough such that seals effectively bar the contaminants from reaching the oil and any oil contaminants may be volatilized and purged from the oil. If the engine temperature, $T_{engine}$ is less than $T_{threshold}$, then the oil degradation count may be incremented. The engine temperature, in addition to how much the engine temperature differs from the threshold temperature can impact how much the oil degradation count is adjusted by the oil degradation counter. For example, the oil degradation count may be incremented by a larger amount for the case where the engine is started where $T_{engine}$ is far below $T_{threshold}$, as compared to the case where the engine is started where $T_{engine}$ is only slightly below $T_{threshold}$. Conversely, the oil degradation count may be decremented by a larger amount for the case where the engine is started where $T_{engine}$ is far above $T_{threshold}$, as compared to the case where the engine is started where $T_{engine}$ is only slightly above $T_{threshold}$. Furthermore, if the engine has been on for a long duration where $T_{engine}$ is above $T_{threshold}$, then the oil degradation count may be decremented by a larger amount than if the engine has been on for a short duration where $T_{engine}$ is above $T_{threshold}$. By accounting for the engine temperature and the difference between the engine and threshold temperatures, and the engine on time, the oil degradation count adjustment can more accurately represent the contaminant level in the oil. As such, over- or under-prediction of the oil contamination level can be reduced as compared to simply counting the number of cold engine stops and starts.

If the engine is not started at 412, then the procedure evaluates if the engine is stopped, at 416. If so, then procedure 400 continues at 418, at which the oil degradation count is adjusted by the oil degradation counter based on the engine on time and the engine temperature in a similar manner as discussed above for engine starts at 414.

Referring to FIG. 4, in the absence of an engine start or an engine stop, the procedure, at 420, determines if the vehicle is running in engine mode. If not, then the engine on timer is reset to zero at 422. If the engine is on at 420, then the procedure increments the engine on timer at 424, and the oil degradation counter adjusts the oil degradation count at 426, according to the engine on time and $T_{engine}$ in a similar manner as discussed above for engine starts at 414. For example, if $T_{engine}$ is below $T_{threshold}$, the oil degradation count may be incremented since the engine is cold, taking into account the value of the engine on timer or the duration the engine has been running cold.

As such, unlike other vehicle problems arising from long periods of engine activity such as fuel contamination, oil contamination is not a phenomenon that monotonically or linearly increases with time. Instead, oil contamination levels may depend on specific events (engine starts or stops when cold, $T_{engine}<T_{threshold}$), and can either increase or decrease during normal vehicle operation. Further, the oil degradation count is not impacted by fuel refill events because the fuel contaminates and degrades the oil regardless of the fuel's age or condition.

Referring to FIG. 4, from 414, 416, 418, 422, and 426, the procedure 400 may return to 312 of FIG. 3, from where it originated.

In this way, an oil degradation counter, in conjunction with an engine on timer, can be used to track and estimate oil contamination levels during vehicle operation, for example by accounting for cold engine start and stop events, which contribute to the oil contamination levels, as well as engine on time (when $T_{engine}>T_{threshold}$) during which oil contaminant levels can be reduced.

FIG. 5 illustrates a procedure 500 for determining if oil clean out conditions are met. The procedure starts at 510, where it is determined if the % oil degradation, derived from the oil degradation count using a lookup table (FIG. 3 at 314), is greater than a first threshold, threshold 1. If so, then the procedure continues to 512, since clean out conditions are met. The first % oil degradation threshold can signify a level above which a clean out is to be started. If the % oil degradation is less than the first threshold, then the procedure determines at 514 if the vehicle operating conditions call for propelling the vehicle in engine mode and the state-of-charge is less than $SOC_{threshold}$. If so, then at 516, the procedure evaluates if the % oil degradation is greater than a second threshold, threshold 2, which is less than the first threshold, threshold 1. If so, then the procedure continues to 518, as the clean out conditions are met. If not, then the procedure continues to 520, as the clean out conditions are not met.

In this way, the consideration of the battery state-of-charge is influenced by the contaminant level. The objective of having an additional threshold is to allow for a condition to perform a cleanout when running in engine mode, the oil degradation level is greater than the second threshold less than the first threshold, and the state of charge is low (less than $SOC_{threshold}$). Because the vehicle is to be run in engine mode, it is efficient to clean out the oil when the oil degradation is above the second threshold since the engine is already running. If the oil clean out is not performed until the oil degradation reaches the first threshold, at that time, the vehicle operating conditions may no longer call for engine mode, and thus, the engine will be run solely for the purpose of cleaning out the oil. In this case, engine operation may not only be inefficient from an energy consumption standpoint given the vehicle operating conditions, but may also be inconvenient to the user. The oil clean outs are carried out responsive to the contaminant amount greater than the threshold even when a fuel in a fuel tank of the vehicle is aged less than a threshold age. The threshold age of the fuel may refer, in one example, to the residence time of the fuel in the fuel tank after which the fuel contaminants may be above a threshold level (fuel degradation threshold) and an engine start may be forced in order to consume the aged fuel.

Referring to FIG. 5, if the engine mode is not selected by the vehicle operating conditions at 514, the procedure continues to 526, where it is determined if the user has requested to run a clean out. If yes, then the clean out conditions are met at 528, else, the clean out conditions are not met at 530. During operation of the vehicle, the oil degradation level can be communicated to the vehicle operator via an oil contamination index meter indicated at 196 of FIG. 1. As such, the user via procedure 500 at 526 is able to request performing a clean out of the oil if they wish to perform a clean out based on the oil degradation level indicated at 196.

Referring to FIG. 5, from 512, 518, 520, 524, 528, and 530, the procedure 500 may return to 322 or 328 of FIG. 3, from where it originated.

In this way, FIG. 5 illustrates a possible set of parameters that establish when conditions to run a clean out of the oil system are met.

Figure 6:
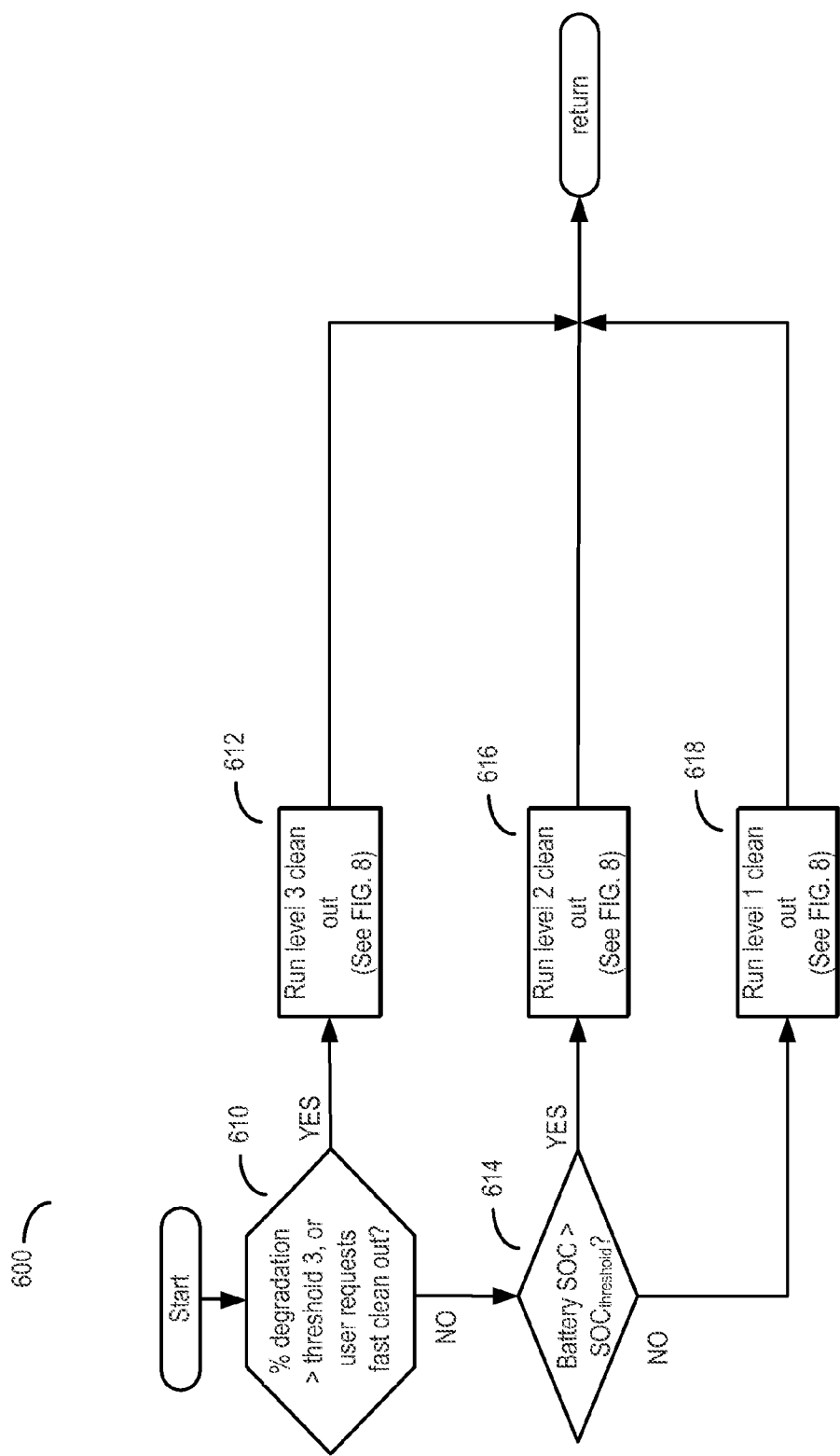
Figure 8:
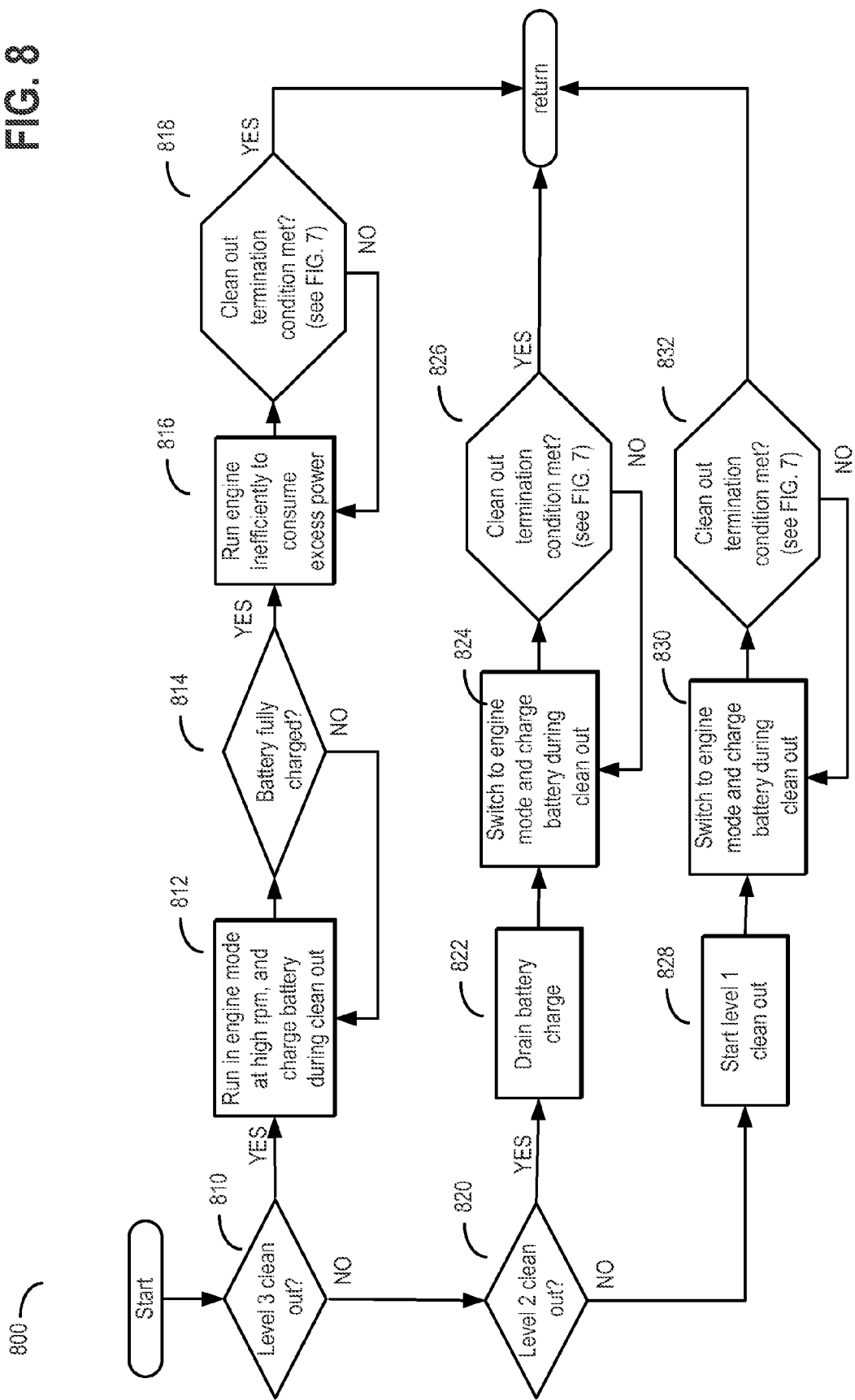

FIG. 6 illustrates a procedure 600 for determining a type of oil clean out that is to be executed. The type of clean out to be executed is determined based on various operating parameters. For example, at 610, if the % oil degradation level is greater than a third threshold, threshold 3, that is greater than the first threshold, threshold 1, or, if the user requests a fast clean out of the oil, then the procedure starts a level 3 clean out of the oil system (612). FIG. 8 provides further example details of a method to perform a level 3 clean out. A level 3 clean out is an example of a clean out method that is performed quickly as compared to the other clean out levels. A fast clean out may be used under conditions, for example, where the % oil degradation level is very high (greater than threshold 3, which is greater than threshold 1). In addition, the user may start a fast clean out because despite a high % oil degradation (greater than threshold 1 but less than threshold 3, for example) necessitating a clean out, the user may wish to operate the vehicle in electric mode, or perhaps simply does not wish to wait for a longer clean out before resuming normal vehicle operation.

Referring to FIG. 6, if the % oil degradation is less than threshold 3 and the user has not requested a fast clean out, procedure 600 assesses if the battery state-of-charge is greater than a threshold state-of-charge, $SOC_{threshold}$ (614). If so, the procedure then continues to 616 where a level 2 clean out is started. Referring to FIG. 6 at 614, if the battery state-of-charge is less than $SOC_{threshold}$ then the procedure 600 continues directly to 618 where a level 1 clean out is started. Consideration of the battery state-of-charge is thus dependent on the contaminant level when determining if an oil clean out is to be started. If the contaminant level is sufficiently high, corresponding to oil degradation above threshold 3, then a fast clean out is executed irrespective of the battery state-of-charge to lower the oil contaminant level. If the % oil degradation is below threshold 3 (a lower contaminant level), then the urgency of an oil clean out is not as immediate, and the clean out is run, taking in to account the battery state-of-charge: where the battery has a state-of-charge greater than a threshold value (above $SOC_{threshold}$), the battery charge is first drained (e.g. by running the vehicle is run in electric mode) before the clean out is begun so that the battery can be charged during the clean out. Where the battery has a state-of-charge less than a threshold value (below $SOC_{threshold}$), the clean out is promptly started without first draining the battery, but rather concurrently charging the battery. FIG. 8 provides further example details of level 2 and level 1 clean outs and how they may be executed.

After performing any one of the level 1, 2 or 3 oil clean outs (612, 616, 618), procedure 600 returns to 324 and 330 of FIG. 3 from where it originated.

Figure 7:
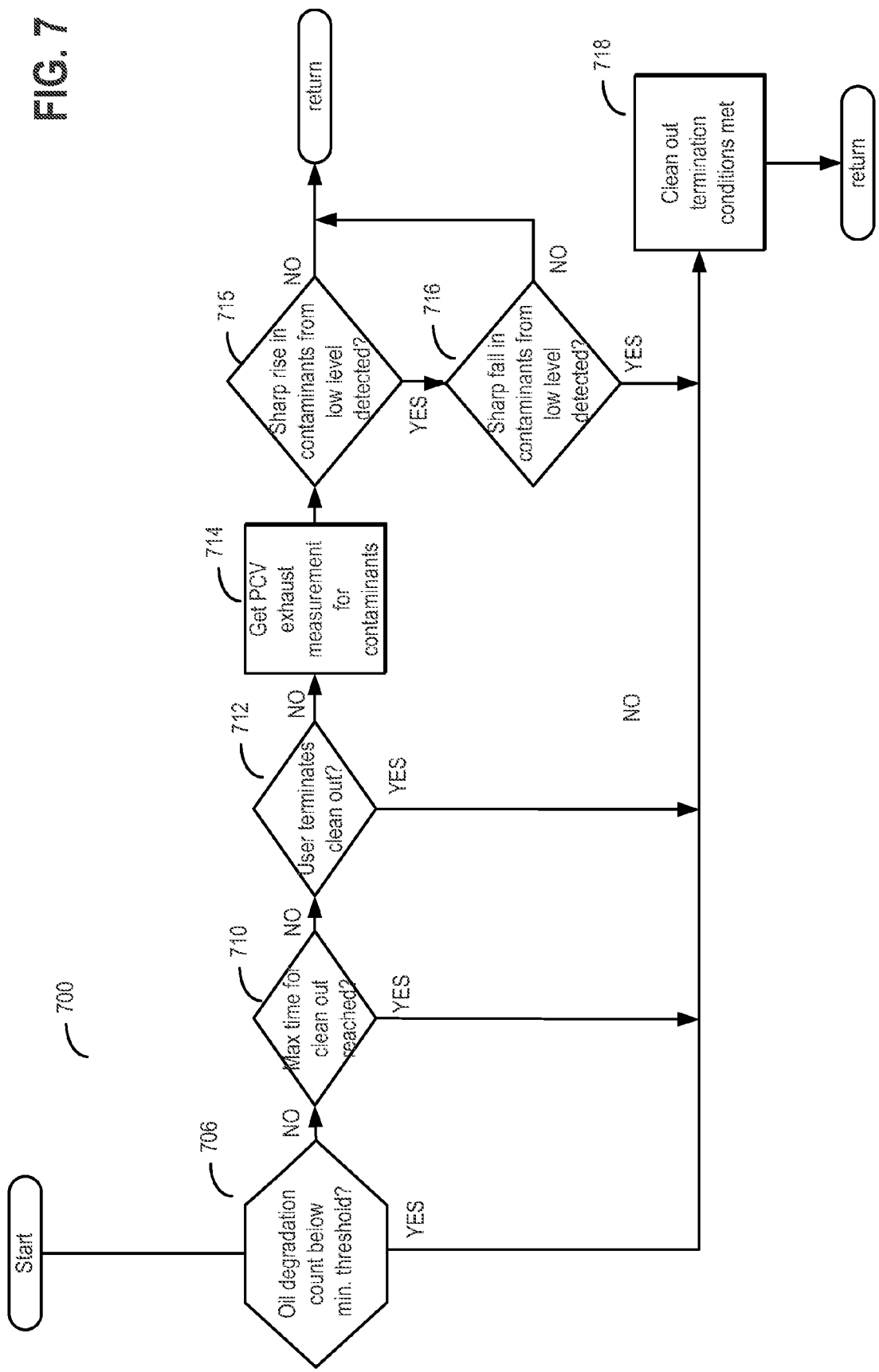

FIG. 7 illustrates a procedure 700 that evaluates various termination conditions that may be used to indicate when the oil clean out procedures can be terminated. First at 706 the procedure determines if the oil degradation count has been reduced below a minimum oil degradation threshold. If yes, then the oil contaminants have been cleaned satisfactorily and the procedure proceeds to 718 where the oil clean out is terminated. If the oil degradation count is not below the minimum oil degradation threshold, then the procedure continues at 710, and determines if a maximum time for the clean out has been reached. As a possible example, once a clean out has been run for an extended period of time, it is likely that the oil has been cleaned of contaminants to an extent such that continued clean out would have a negligible effect on the oil contamination level and would be a waste of energy. Moreover, as the clean out time is extended, it is more likely that the clean out procedure will interfere with normal vehicle operation or be an inconvenience to the user. If the maximum time for a clean out has been reached, then the procedure 700 terminates the clean out (718). If not, the procedure continues at 712, where it determines if the user has requested to terminate the clean out. The user may wish to terminate the clean out prematurely for various reasons. For example, the user may have reached their destination and the vehicle is switched off, the user may wish to run solely in electric mode, or the user may feel that the oil has been cleaned out to their satisfaction or to a satisfactory level as indicated by the oil contamination index meter (196). If the user has requested to terminate the clean out, then the procedure 700 terminates the clean out (718). If not, the procedure continues at 714, where the contaminant level measured at the positive crankcase ventilation (PCV) exhaust is retrieved. A possible example of a method to measure contaminants such as fuel or water vapor in the PCV exhaust is to employ a humidity and/or hydrocarbon sensor in the PCV exhaust line, as described herein. For example, after initiation of the clean out operation (e.g., once engine temperature reaches a threshold), the sensor may indicate when a moisture amount and/or hydrocarbon amount drops below a minimum threshold amount, thus indicating that the clean out can be terminated. In this way, it is possible to determine when the contaminants are removed from the oil, and when the clean out procedure is to be terminated, so as to avoid unnecessarily prolonging the clean out procedure and wasting energy. In another example embodiment, when the procedure 700 detects a spike, indicated by a sharp rise from a low level (715) followed by a sharp fall back to the low level (716), in the contaminant level measured, for example, by a humidity and/or hydrocarbon sensor at 714, the clean out is terminated (718). In a further embodiment, the oil degradation count can be decremented or adjusted based on the characteristics of the spike in the contaminant level detected, including the duration or integral of the spike. For example, if the integral of the spike in contaminants detected in the PCV exhaust line is less than a minimum threshold amount, then the oil degradation count is not adjusted by the oil degradation counter, and the clean out may not be terminated. After termination of the clean out, or if none of the termination conditions are met, procedure 700 returns to FIG. 8 at 818, 826 or 832, from where it originated.

FIG. 8 illustrates a procedure 800 for executing different types of oil clean outs depending on the vehicle operating conditions as determined by procedure 600, FIG. 6. At 810, procedure 800 determines if a level 3 clean out is to be run. A level 3 clean out is an example of a clean out method that is performed quickly as compared to the other clean out levels. A fast clean out may be started under conditions, for example, where the % oil degradation level is very high (greater than threshold 3, which is greater than threshold 1). In addition, the user may start a fast clean out because despite a high % oil degradation (greater than threshold 1, for example) necessitating a clean out, the user may wish to operate the vehicle in electric mode, or perhaps simply does not wish to wait for a longer clean out before resuming normal vehicle operation. The level 3 clean out begins at 812, where the vehicle is run in engine mode at high RPM and charges the battery. When the battery is fully charged (814), the engine is run inefficiently (816) to consume excess power and to continue completion of the clean out quickly as compared to other clean out levels. Some possible example methods of running the engine inefficiently include generating compression braking in which valve timing is adjusted to release compressed fresh air and/or compressed exhaust gas into the intake manifold and/or exhaust manifold, thus wasting compression effort with less than full recovery during an expansion stroke. Other examples include: running the engine at a higher RPM than during other engine running modes for the same operating conditions (e.g. as compared to the same temperature, battery state-of-charge, engine load, or engine torque level, during other operating modes where the engine is run); reducing the exhaust gas recirculation (EGR) from the EGR level when running in other engine modes for the same vehicle operating conditions to generate higher peak combustion temperatures and thus higher thermal energy losses in the engine; retarding the engine spark timing, beyond a threshold from MBT (maximum torque) timing, relative to the spark timing used when running in other engine modes at the same vehicle operating conditions so that expansion of combustion gases occurs after the end of the compression stroke thereby reducing the transfer of mechanical energy to the piston; reducing the engine throttle from the engine throttle used when running in other engine modes for the same vehicle operating conditions so as to slightly enrich the fuel-to-air ratio and increase the fuel combustion for the same engine output power. The method of running the engine inefficiently is not limited to these examples, and can include other methods of running the engine inefficiently. The choice of method used may depend on the vehicle operating conditions. For example, if the vehicle is traveling downhill, compression braking may be employed; running the engine at high RPM may be employed if the vehicle is traveling uphill or on rough, bumpy roads. Thus, efficient engine operation can be achieved.

When the oil degradation is severe or if the clean out is to be performed quickly, the engine can be run inefficiently to quickly heat the engine, and volatilize and purge the contaminants from the oil. In contrast, engine efficiency is not a consideration for resolving fuel contamination or "stale" fuel arising from engine inactivity. Rather, the vehicle is simply switched to engine mode to consume the stale fuel.

Additionally, under conditions where prior to starting an oil clean out the engine is already warm or at a higher temperature above a warm-up temperature threshold (e.g. it has recently been run to operate the vehicle for an extended period), the oil clean out is of a shorter duration, thereby conserving fuel, whereas if the engine is cold or at a lower temperature prior to starting an oil clean out, then the oil clean out is of a longer duration, since the engine is first warmed up before contaminants are purged from the oil. Accordingly, oil clean outs beginning with a cold engine start can consume more fuel. Moreover, the cold engine start initiated by the clean out further adds to the level of oil contaminants.

Referring again to FIG. 8, if a level 3 clean out is not to be run, procedure 800 determines if a level 2 clean out is to be run. A level 2 clean out is run when the battery state-of-charge is greater than $SOC_{threshold}$ and the oil degradation level is greater than a threshold 1, but less than threshold 3. Under these conditions, a fast clean out is not carried out. If a level 2 clean out is to be run, the vehicle is first operated in a manner so as to drain the battery state-of-charge (822) to a threshold level. Some possible example methods of draining the state-of-charge are to run the vehicle in electric mode, turning on the PTC heater, or other methods that consume the electric AC power. When the state-of-charge has been sufficiently drained, the procedure continues to 824 where the vehicle is switched to engine mode to clean out the oil, while recharging the battery.

If at 820, a level 2 clean out is not to be run, then a level 1 clean out is started (828). The vehicle is switched to engine mode (830), and the battery is recharged while the engine is run to perform the clean out.

Referring to FIG. 8 at 818, 826, and 832, during a level 1, 2 or 3 oil clean out, the procedure 800 repeatedly checks to see if a clean out termination condition has been met. The clean out termination conditions are outlined in further detail in FIG. 7. If a clean out termination condition has been met, then procedure 800 returns to FIG. 6 at 612, 616 or 618, from where it originated. If a clean out termination condition has not been met, then the clean out is resumed.

Figure 9:
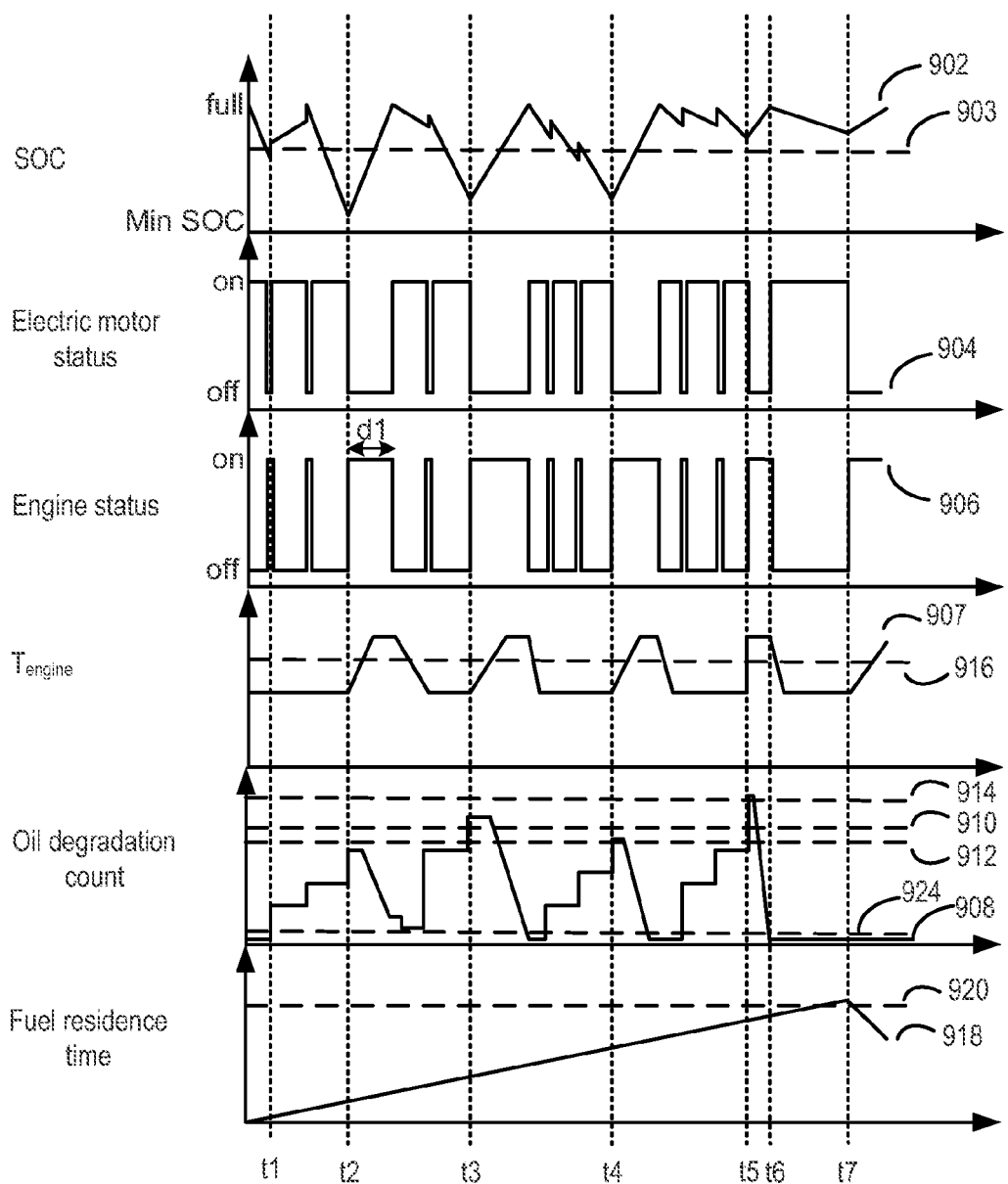
FIG. 9 illustrates an example timeline.

FIG. 9 illustrates a possible timeline of the vehicle operation with the timeline approximately to scale, depicting trends of the battery state-of-charge (902), electric motor (904) and engine status (906), engine temperature ($T_{engine}$) (907), oil degradation count (908), and fuel residence time (918). Also shown on the timeline are $SOC_{threshold}$ (903), $T_{threshold}$ (916), oil degradation first threshold (910), oil degradation second threshold (912), oil degradation third threshold (914), and fuel threshold age (920). Prior to t1, the vehicle is running in electric mode (the engine is off), and the battery state-of-charge is high. Time t1 illustrates an instance where engine operation is requested intermittently, for example when the vehicle encounters a short steep ascent in the road, and the engine is started or stopped momentarily to propel the vehicle up the hill. The oil degradation count is incremented at a because the engine is cold ($T_{engine} < T_{threshold}$ (916)) when started and stopped, having been used momentarily. Between times t1 and t2, the timeline shows the oil degradation count increasing in response to further cold engine starts and stops. At time t2, a duration of time, d1, begins where the engine is switched on for an extended period, the electric motor is off, and the battery is charging. Since the engine is run for an extended period, the engine temperature warms ($T_{engine} > T_{threshold}$), and the oil degradation count is decremented until the conclusion of d1, when the engine is turned off. At time, t3, the oil degradation count has exceeded a first threshold, threshold 1 (910), and a level 1 clean out is started. Since the battery state-of-charge is less than $SOC_{threshold}$ (903) at t3, the vehicle is switched to engine mode and the battery is charged during the clean out. Once the oil degradation count is reduced below the minimum oil degradation threshold (924), the clean out is terminated. Time t4 depicts another instance where the oil clean out conditions are met (FIG. 5, 514). At time, t4, a level 1 oil clean out is started because although the oil degradation count is less than the first threshold (910), it is greater than the second threshold (912), and the vehicle operating conditions call for a switch to engine mode, and the battery state-of-charge is less than $SOC_{threshold}$. During the clean out, the battery is recharged. When the oil degradation count is reduced below the minimum oil degradation threshold (924), the clean out is terminated. At time, t5, the oil degradation count has risen above threshold 3 (914), signaling that a fast clean out (level 3 clean out) is requested. Despite a high battery state-of-charge, the vehicle operation is switched to engine mode immediately. In order to carry out the clean out quickly, the engine is operated inefficiently by employing compression braking, running at high RPM, adjusting EGR, retarding spark timing, adjusting the throttle, adjusting the engine valve timing, and the like. After a short time, at t6, the oil degradation count is reduced below the minimum oil degradation threshold (924), and the clean out is terminated. After t6, the vehicle resumes operation in electric mode.

FIG. 9 also describes a further embodiment of a method for controlling a plug-in hybrid vehicle having an engine, comprising: during a first vehicle moving engine stopped condition, starting the engine (e.g. at time t2) when a battery state-of-charge is less than an upper threshold (903), even when a fuel residence time is less than a threshold age (920), corresponding to a fuel contamination level being less than a degraded fuel threshold), and even when an oil level contamination is less than a degraded oil threshold (910); during a second vehicle moving engine stopped condition, starting the engine (e.g. at time t5) when the battery state-of-charge is greater than the upper threshold (903) and when the oil level contamination is greater than the degraded oil threshold (910), even when the fuel residence time is less than a threshold age (920, corresponding to a fuel contamination level being less than a degraded fuel threshold); and during a third vehicle moving engine stopped condition, starting the engine (e.g. at time t7) when the battery state of charge is greater than the upper threshold (903) and when the fuel residence time is greater than a threshold age (920, corresponding to a fuel contamination level being greater than a degraded fuel threshold), even when the oil level contamination is less than the degraded oil threshold (910).

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
  propelling a vehicle with an engine and a motor;
  a first and second charge threshold, the first charge threshold greater than the second charge threshold, and
  starting the engine if energy stored in an energy storage device is greater than the first charge threshold when a contaminant amount in engine oil is greater than a contaminant threshold amount, wherein
  the contaminant amount is determined based on a number of counted engine starts where engine temperature is less than a temperature threshold, engine stops where engine temperature is less than the temperature threshold, and engine on time.

2. The method of claim 1 wherein the energy storage device is a battery, the method further comprising starting the engine if the energy stored is less than the second charge threshold irrespective of the contaminant amount.

3. The method of claim 1 wherein engine operation following the start is terminated based on an amount of contaminants delivered from a positive crankcase ventilation (PCV) line to the engine.

4. The method of claim 3 wherein the termination is based on an increase and a decrease in contaminants measured in the PCV line after the engine reaches a warm-up temperature from the start.

5. The method of claim 1 wherein the engine start is carried out responsive to the contaminant amount greater than the contaminant threshold amount even when a fuel in a fuel tank of the vehicle is aged less than a threshold.

6. The method of claim 1 wherein the engine start is carried out responsive to the contaminant amount greater than the contaminant threshold amount even when a fuel in a fuel tank of the vehicle was added during engine shutdown, and where vehicle shutdown conditions immediately preceding subsequent vehicle operation include the engine start.

7. A method, comprising:
  shutting down engine operation in a plug-in hybrid vehicle in response to a level of contaminants in a positive crankcase ventilation (PCV) exhaust line, the engine started based on a contaminant level in engine oil,
  wherein the level of contaminants is based on a counted number of engine starts where engine temperature is less than a first temperature threshold and engine stops where engine temperature is less than the first temperature threshold, and further based on a duration of engine run operation above a second temperature threshold, and further based on a duration of engine run operation below the second temperature threshold following the start.

8. The method of claim 7 wherein the engine start based on the contaminant level occurs even when a fuel in a fuel tank of the vehicle was refilled within a threshold time of the engine start.

9. The method of claim 7 wherein the engine start is further based on a battery state-of-charge depending on the contaminant level;
  wherein, responsive to the contaminant level being greater than a first threshold, the shutting down occurs at a first duration after the engine start; and
  wherein, responsive to the contaminant level being greater than a second threshold but less than the first threshold, the shutting down occurs at a second duration after the engine start, the first threshold being greater than the second threshold, and the first duration being shorter than the second duration.

10. The method of claim 7 wherein the contaminant level in engine oil is reduced by an amount based on the level of contaminants in the PCV exhaust line.

11. The method of claim 10 further comprising starting the engine when the engine has been shut down for a time greater than a shutdown threshold, even when the contaminant amount is below a contaminant threshold indicating oil degradation.

12. A method for a plug-in hybrid vehicle having an engine, the method comprising:
  during a higher temperature of the engine, starting the engine responsive to a contaminant amount in engine oil, the engine operated for a shorter duration; and
  during a lower engine temperature, starting the engine responsive to the contaminant amount in engine oil, the engine operated for a longer duration; wherein
  the contaminant amount is determined based on a number of counted engine starts where engine temperature is less than a temperature threshold, engine stops where engine temperature is less than the temperature threshold, and engine on time.

13. The method of claim 12 wherein during the higher and lower engine temperatures, the engine is started with a battery state-of-charge greater than a charge threshold, the method further comprising starting the engine when the battery state-of-charge is below the charge threshold irrespective of the contaminant amount.

14. The method of claim 12, further comprising:

during a higher battery state-of-charge, starting the engine responsive to the contaminant amount in the engine oil, the engine operated with increased heat output as compared to an engine start responsive to the contaminant amount during a lower battery state-of-charge.

15. The method of claim 14 wherein the engine operation with increased heat output includes operating the engine at a higher engine speed;

wherein, during the higher temperature, starting the engine responsive to the contaminant amount comprises starting the engine responsive to the contaminant amount being greater than a first threshold; and wherein, during the lower temperature, starting the engine responsive to the contaminant amount comprises starting the engine responsive to the contaminant amount being greater than a second threshold, the second threshold being lower than the first threshold.

16. The method of claim 14 wherein operating the engine with increased heat output includes operating the engine with spark timing retarded beyond a threshold from MBT (maximum torque) timing.

17. The method of claim 1, wherein the contaminant amount is decremented responsive to a level of contaminants detected in a PCV exhaust line.

18. The method of claim 1, wherein the contaminant amount is decremented responsive to running the engine while the engine temperature is greater than a second temperature threshold.

19. The method of claim 1, wherein the contaminant amount is decremented responsive to starting the engine while the engine temperature is greater than a second temperature threshold.

20. The method of claim 1, wherein the contaminant threshold is a first contaminant threshold; and wherein starting the engine when the contaminant amount is greater than the first contaminant threshold includes
responsive to the contaminant amount being greater than the first contaminant threshold but less than a second contaminant threshold, running the engine for a longer duration at a lower temperature; and
responsive to the contaminant amount being greater than the second contaminant threshold, running the engine for a shorter duration at a higher temperature, where the second contaminant threshold is greater than the first contaminant threshold.

\* \* \* \* \*